(12) United States Patent
Ide et al.

(10) Patent No.: US 11,439,927 B2
(45) Date of Patent: Sep. 13, 2022

(54) SPECIES EXTRACTION

(71) Applicant: ExxonMobil Technology and Engineering Company, Annandale, NJ (US)

(72) Inventors: Matthew S. Ide, Doylestown, PA (US); Mohsen S. Yeganeh, Newtown, PA (US); John B. Barnes, Cleveland, TX (US); Jessica L. Vreeland, Phillipsburg, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 346 days.

(21) Appl. No.: 16/660,080

(22) Filed: Oct. 22, 2019

(65) Prior Publication Data
US 2020/0147519 A1    May 14, 2020

Related U.S. Application Data

(60) Provisional application No. 62/875,624, filed on Jul. 18, 2019, provisional application No. 62/757,206, filed on Nov. 8, 2018, provisional application No. 62/757,209, filed on Nov. 8, 2018.

(51) Int. Cl.
*B01D 19/00* (2006.01)
*B01D 69/14* (2006.01)

(52) U.S. Cl.
CPC ....... *B01D 19/0031* (2013.01); *B01D 69/147* (2013.01); *B01D 2252/204* (2013.01); *B01D 2257/504* (2013.01); *B01D 2313/20* (2013.01)

(58) Field of Classification Search
None
See application file for complete search history.

(56) References Cited

U.S. PATENT DOCUMENTS

| 3,758,404 A | 9/1973 | Clonts et al. |
| 4,267,978 A | 5/1981 | Manteufel |

(Continued)

FOREIGN PATENT DOCUMENTS

| WO | 2017055615 A1 | 4/2017 |
| WO | 2018/191523 A1 | 10/2018 |

OTHER PUBLICATIONS

Zaini, et al., Adsorption of Carbon Dioxide on Monoethanolamine (MEA)-Impregnated Kenaf Core Fiber by Pressure Swing Adsorption System, Jurnal Teknologi, Mar. 2014, pp. 11-16, Penerbit UTM Press.

(Continued)

*Primary Examiner* — Jason M Greene
(74) *Attorney, Agent, or Firm* — Kristina Okafor

(57) ABSTRACT

A species extraction apparatus for liquid-based extractions is disclosed herein. The apparatus comprises a body supporting a matrix structure comprising cellular units. The apparatus is configured to uptake an absorptive liquid, and the absorptive liquid can remove at least one species from a working fluid that contacts the apparatus. In certain embodiments, the at least one species can be $CO_2$, and the absorptive liquid can be liquid water-free tetraethylenepentamine (TEPA). The apparatus is advantageously manufacture using additive manufacturing techniques.

20 Claims, 4 Drawing Sheets

(56) References Cited

U.S. PATENT DOCUMENTS

| | | | |
|---|---|---|---|
| 4,855,102 A * | 8/1989 | Okada | H01L 24/13 |
| | | | 419/8 |
| 5,393,429 A | 2/1995 | Nakayama et al. | |
| 6,293,526 B1 | 9/2001 | Fischer et al. | |
| 6,402,818 B1 | 6/2002 | Sengupta et al. | |
| 6,574,704 B1 | 6/2003 | Ishida et al. | |
| 8,574,704 B2 | 11/2013 | Smith et al. | |
| 2013/0312608 A1 * | 11/2013 | Zaman | B01D 53/18 |
| | | | 95/211 |
| 2014/0331864 A1 * | 11/2014 | Ogino | B01D 53/08 |
| | | | 96/145 |
| 2015/0196940 A1 | 7/2015 | Aizenberg et al. | |
| 2016/0023187 A1 * | 1/2016 | Hedlund | B01D 67/0051 |
| | | | 502/64 |
| 2018/0361312 A1 * | 12/2018 | Dutra e Mello | B01D 53/18 |
| 2019/0299293 A1 * | 10/2019 | Lynch | B01D 53/1475 |

OTHER PUBLICATIONS

The Partial Search Report and Provisional Opinion of PCT/US2019/057387 dated Feb. 10, 2020.

The Partial Search Report and Provisional Opinion of PCT/US2019/057378 dated Feb. 10, 2020.

The International Search Report and Written Opinion of PCT/US2019/057382 dated Feb. 10, 2020.

Stepankova, et al., Strategies for Stabilization of Enzymes in Organic Solvents, ACS Catalysis, Oct. 2013, pp. 2823-2836, American Chemical Society.

O'Reilly, et al, Porous Liquids, Chemistry—A European Journal, Mar. 2007, pp. 3021-3025, vol. 13, WILEY-VCH Verlag GmbH & Co. KGaA, Weinheim.

Bilek, et al., Plasma Modified Surfaces for Covalent Immobilization of Functional Biomolecules in the Absence of Chemial Linkers: Towards Better Biosensors and a New Generation of Medical Implants, Biophysical Reviews, May 2010, pp. 55-65, vol. 2, issue 2, Springer-Verlag.

Kawakami, et al., Immobilization of Glucose Oxidase on Polymer Membranes Treated by Low-Temperature Plasma, Biotechnology and Bioengineering, Jul. 1988, pp. 369-373, vol. 425, John Wiley & Sons, Inc.

Xin, et al., Liquid-liquid equilibria for the extraction of furfural from aqueous solution using different solvents, Fluid Phase Equilibria, Jun. 2016, pp. 393-401, Elsevier B.V.

Xu, et al., Preparation and characterization of novel $CO_2$ "molecular basket" adsorbents based on polymer-modified mesoporous molecular sieve MCM-41, Microporous and Mesoporous Materials, Aug. 2003, pp. 29-45, vol. 62, Elsevier Inc.

Cao, et al., Capture of carbon dioxide from flue gas on TEPA-grafted metal-organic framework Mg2(dobdc), Journal of Environmental Sciences, Oct. 2013, pp. 2081-2087, vol. 25, issue 10, Elsevier.

Hicks, et al., Designing Adsorbents for $CO_2$ Capture from Flue Gas-Hyperbranched Aminosilicas Capable of Capturing $CO_2$ Reversibly, Journal of American Chemical Society, Feb. 2008, pp. 2902-2903, vol. 130, American Chemical Society.

\* cited by examiner

SPECIES EXTRACTION

CROSS-REFERENCE TO RELATED APPLICATIONS

This application claims priority to U.S. Provisional Application No. 62/875,624 filed Jul. 18, 2019; U.S. Provisional Application No. 62/757,206 filed Nov. 8, 2018; and U.S. Provisional Application No. 62/757,209 filed Nov. 8, 2018, the entirety of each of which are herein incorporated by reference in their entirety.

FIELD

This disclosure relates to species extraction, and particularly methods for the removal of a species in a first fluid, such as a gas or a liquid, using a second fluid such as a liquid.

BACKGROUND

In a liquid-based extraction, a working fluid that contains species that need to be separated and removed is contacted with a liquid. Appropriate selection of the liquid and liquid/fluid contactors enables mass transfer of the contaminants from the working fluid to the liquid for separation and removal. Liquid-based absorption/extraction has been practiced in many important industrial applications. For example, removal of carbon dioxide from flue gas (the working fluid) can be carried out by contacting liquid amine (the liquid) with flue gas. Mass transfer of $CO_2$ through the flue gas/amine interface into the amine occurs, causing $CO_2$ to react with the liquid amine. This process can be highly beneficial for the removal of $CO_2$ but currently requires large amine dilution with water to control viscosity and has low gas-liquid contactor efficiency. As such, large-scale contactor and regenerator equipment are required.

An effective liquid-based extraction requires good mass transfer of the contaminants across the liquid/fluid interface. The efficiency depends on the mass transfer rate across the liquid/fluid interface, which is strongly affected by the interfacial surface area between the liquid and fluid. A high surface area between the liquid and the fluid is generally best for efficient operations. Many commercial processes achieve higher surface areas by rigorously mixing the working fluid with the liquid in a tower with one or more contactors, which are designed to increase surface area between the fluid and the liquid in a fixed volume. This approach, however, requires high volumes of material and consumes a significant amount of energy. Even then, a substantial amount of liquid and fluid do not interact because of the poor surface-to-volume ratio. As a result, a substantial amount of the liquid and fluid still remain unused and ineffective.

The need for high energy mixing and large volume containers, as well as the large volume of unused fluid-liquid, make the capital and operational expenditure of current practices high. There is a need for systems and methods that increase the surface area between the working fluid and the liquid (i.e., the interfacial surface area) in liquid-based extraction methods. This could reduce the required volume of materials in the extraction and reduce capital and operational expenditure by reducing the required liquid-fluid contactor size.

SUMMARY

A species extraction apparatus disclosed herein comprises a body supporting a matrix structure, and is configured to uptake an absorptive liquid contacted with the apparatus. The absorptive liquid removes at least one species from a working fluid. In some embodiments, the at least one species can comprise $CO_2$, and the absorptive liquid can comprise liquid water-free tetraethylenepentamine (TEPA). Use of "liquid water-free TEPA" herein means that liquid water (or other suitable fluid) is not added to the TEPA to increase its viscosity, as is common in conventional liquid-based extraction methods. Any other suitable species and absorptive liquid is contemplated herein.

The surface area, S, of the apparatus per apparatus volume, S/V, is greater than 180 $m^{-1}$, greater than 500 $m^{-1}$, or greater than 1000 $m^{-1}$. For purposes of this calculation, surface area, S, includes the surface area provided by both the internal-facing and external-facing surface areas of the body and matrix structure. However, given that it is difficult to account for micro-scale surface roughness, the calculation of S presumes that the internal-facing and external-facing surfaces are smooth. For example, the calculation of S includes the additional surface area provided by the cellular structures inside the matrix, but presumes for simplicity that the surfaces of the walls making up the cells (the surfaces of nodes 701 and struts 703 in FIG. 7) are smooth. The system volume, V, is defined as the geometric volume of the structure based only on the dimensions of the external surfaces, and presuming those surfaces are smooth. In other words, V is calculated in a simplified manner that presumes a solid structure defined by its external surfaces, with no micro-textures on those external surfaces and no internal matrix. These calculations can be performed by a software program such as nTopology Element or Autodesk NetFabb.

The body may comprise cellular structures, such as a plurality of hex prism laves phase units formed together to make up the matrix structure. In certain embodiments, the outside body containing the matrix structure can be cylindrically-shaped, optionally with external-facing pores, fins, filaments, or other textures.

In certain embodiments, the apparatus can be pre-treated prior to use to increase its capacity for intake of the working fluid. For example, the apparatus can be calcined at high temperature in the presence of air or other suitable fluid before the absorptive liquid is disposed thereon.

The apparatus can be additively manufactured via a 3D printing process, such as direct metal laser sintering (DMLS) using a metal powder. A predetermined energy density from about 0.5 J/mm to about 5 J/mm can increase a species breakthrough time (Tb) and a Tb/mass (tbw) of absorptive liquid loaded onto the matrix structure. The apparatus material can be stainless steel, wherein the energy density is about 2 J/mm. The apparatus material could also be aluminum wherein the energy density is about 3 J/mm.

A method can include forming a species extraction apparatus comprising a body supporting a matrix structure configured to hold an absorptive liquid disposed on the structure, and pre-treating the apparatus prior to use. The method may include loading the absorptive liquid after pre-treatment. Loading the absorptive liquid can include loading liquid water-free TEPA.

Forming can include additively manufacturing the apparatus out of metal. Additive manufacturing can include selective laser sintering or direct metal laser sintering at an energy density less than about 5 J/mm. Forming can include forming the apparatus to include an S/V ratio of greater than 180 $m^{-1}$.

These and other features of the embodiments of the subject disclosure will become more readily apparent to those skilled in the art from the following detailed description taken in conjunction with the drawings.

DETAILED DESCRIPTION

Figure 1:
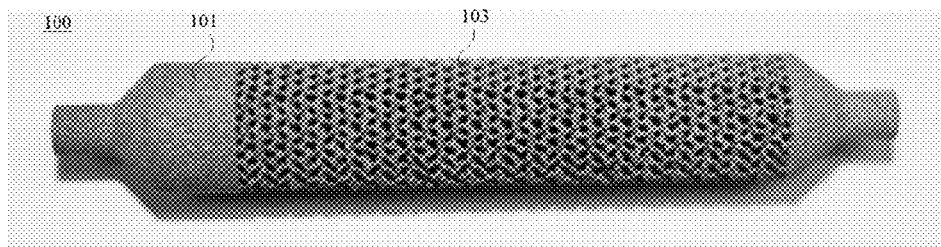
FIG. 1 is a perspective view of an embodiment of a species extraction apparatus made of AlSi10Mg.
Figure 2:
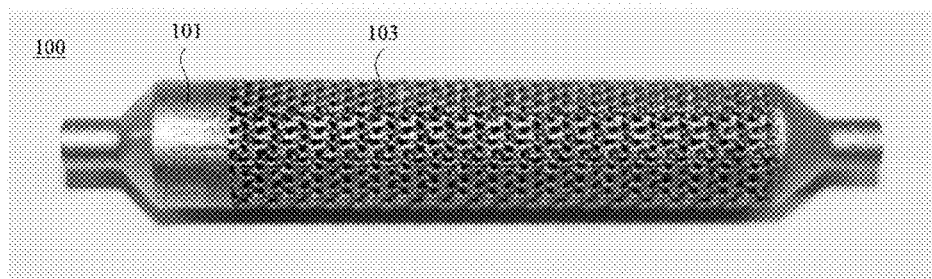
FIG. 2 is a perspective view of the embodiment of FIG. 1, made of stainless steel (316SS).

Referring to FIGS. 1 and 2, a species extraction apparatus 100 can include a body 101 supporting a matrix structure 103. The matrix structure 103 comprises a plurality of surfaces that function to enhance uptake of the absorptive liquid and provide a complex, tortuous flow path for the working fluid. These features increase contact between the absorptive liquid and working fluid that is passed through the apparatus, and thus improve the efficiency of the species extraction apparatus 100.

In certain embodiments, the absorptive liquid is infused within at least a portion of the texture of the species extraction apparatus 100. This is referred to herein as a liquid infused surface, infused liquid, or the like. When the absorptive liquid covers the entire top surfaces of the textures, it is referred herein to as a liquid encapsulated solid, encapsulation, or the like. Both a liquid infused surface and a liquid encapsulated solid may be referred to herein as a liquid impregnated solid.

Figure 3:
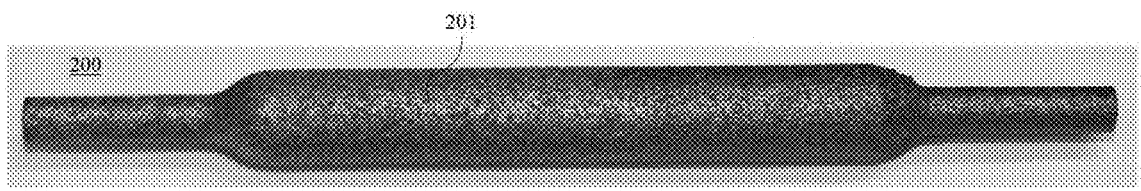
FIG. 3 is a perspective view of another embodiment of a species extraction apparatus shown in pipe/cylindrical form enclosing a matrix structure.
Figure 4:
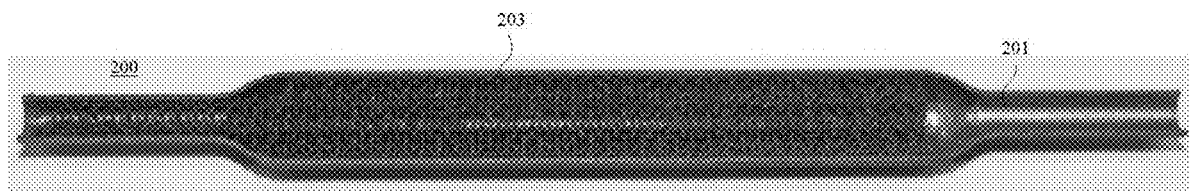
FIG. 4 is a cross-sectional view of the embodiment of FIG. 4, showing the matrix structure.
Figure 5:
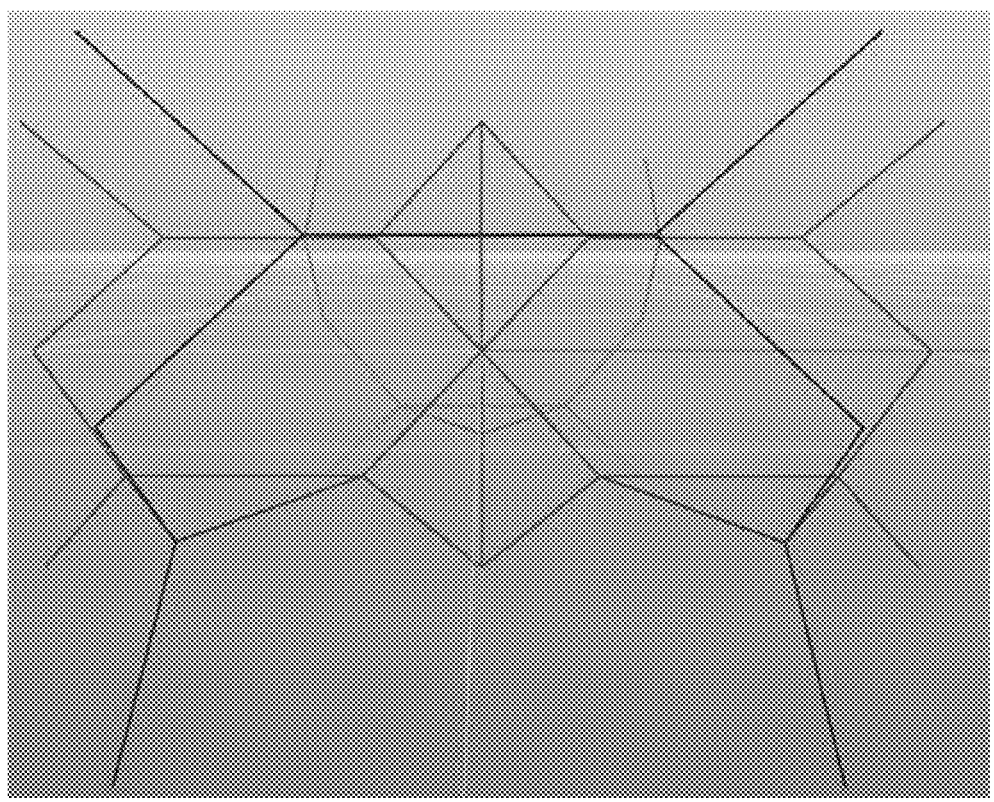
FIG. 5 is a perspective view of a shape of a unit cell of an embodiment of a matrix structure.
Figure 6:
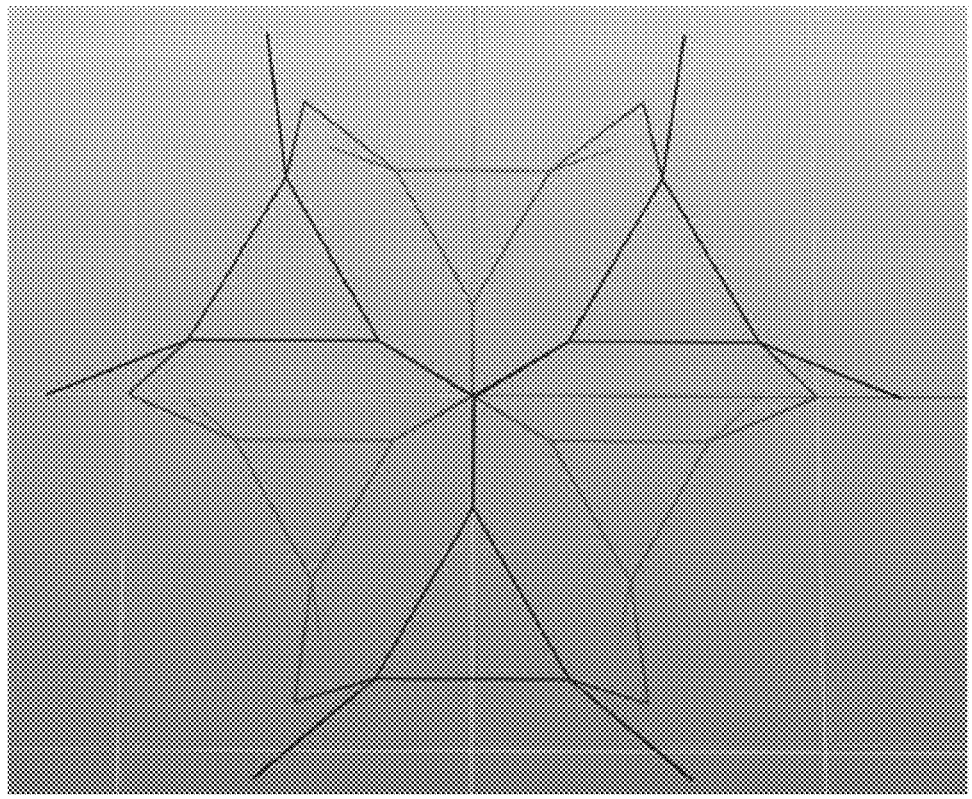
FIG. 6 is a plan view of the embodiment of FIG. 5.
Figure 7:
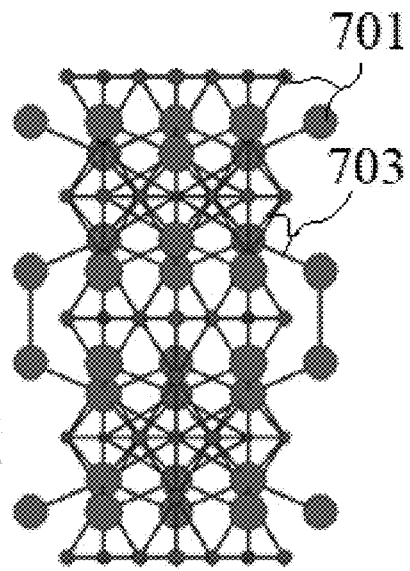
FIG. 7 is an elevation view of a wireframe model of a portion of a matrix structure.
Figure 9:
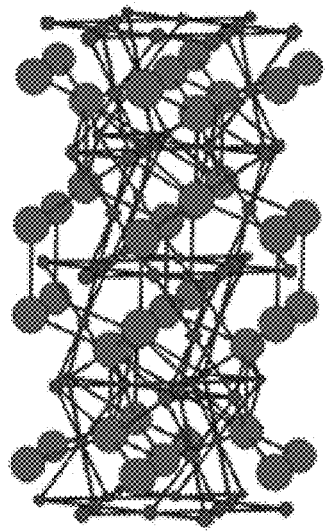
FIG. 9 is a perspective view of the embodiment of FIG. 7.
Figure 8:
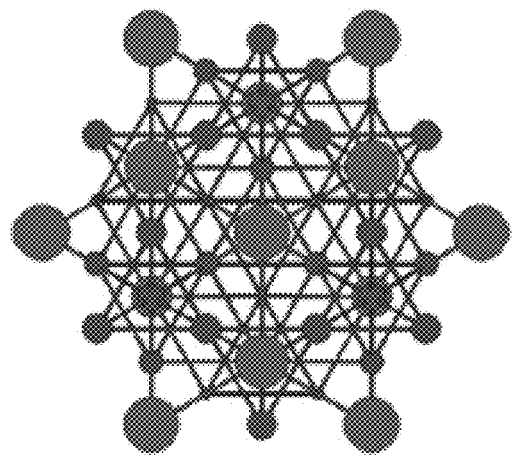
FIG. 8 is a plan view of the embodiment of FIG. 7.
Figure 10:
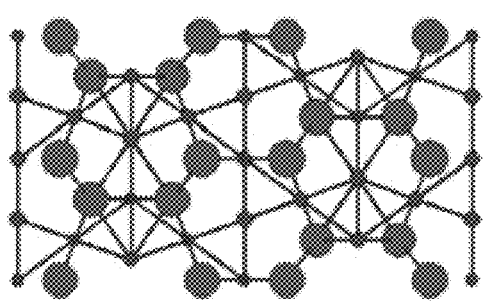
FIG. 10 is an elevation view of the embodiment of FIG. 7, rotated 90 degrees.

As shown in FIGS. 1 and 2, the matrix structure 103 can be externally accessible. In other embodiments as shown in FIGS. 3 and 4, the species extraction contactor 200 can contain the matrix structure 203 within the body 201 such that it is only accessible internally. For example, as shown, the body 201 can form a pipe with an outer shell for channeling flow through the pipe. The outer shell can provide one or more benefits, in addition to the ease of operation, as no assembly is required when the entire structure is manufactured as one. For example, a tortuous path combined with the outer shell may greatly reduce potential bypass issues as no additional wrapping or loading of the cellular structure into a reactor or tube is required. Also, the contact of the cellular structure to the shell of the body 201 can provide a direct path for the conduction of heat that could be utilized to desorb the absorbed gas species from the supported absorptive liquid. Additionally, both the shell as well as the inside matrix structure 203 are capable of providing the characteristics of a support structure for a liquid impregnated solid.

The species extraction apparatuses 100 and 200 can be configured to uptake an absorptive liquid disposed on the matrix structures 103 and 203. The absorptive liquid can be configured to remove at least one species from a working fluid that contacts the matrix structures 103 and 203. For example, embodiments can include suitable internal and external surface roughness, textures, or structural features to uptake a suitable amount of absorptive liquid (e.g., to produce $CO_2$ absorption in accordance with the tables below).

In some embodiments, the performance index (PI) of the apparatus is greater than 150.0 $m^{-1}$ or greater than 500.0 $m^{-1}$. PI is defined as PI=(V1/V)(A1/V). V1 and A1 are the volume and surface area of the impregnating/absorptive liquid, respectively. V1 may be determined by weighing the apparatus before and after applying the absorptive liquid, and then converting the mass difference (e.g., the mass of absorptive liquid held by the apparatus) into a volume using the density of the absorptive fluid. Where the absorptive liquid perfectly or nearly-perfectly wets all of the surfaces of the apparatus, A1 is essentially equal to S, the surface area of the apparatus. In such cases, S is substituted for A1 in the calculation of PI for simplicity. For purposes of the PI calculation herein, perfect or near-perfect wetting is presumed and thus S is used for A1 in the calculation of PI. The amount of absorptive liquid that the apparatuses disclosed herein uptake suggests that this assumption is reasonable. Systems with a PI greater than 150 $m^{-1}$ are more efficient, and thus can be smaller and less expensive than conventional systems.

Certain embodiments can include a surface treatment configured to chemically activate the surface to cause interaction with and/or wetting of the surface by the selected absorptive liquid. Any suitable chemical surface treatment or other treatment to cause wetting of the surface by the absorptive liquid is contemplated herein. Such an activated surface can greatly enhance uptake of the absorptive liquid.

In certain embodiments, the working fluid can comprise $CO_2$, and the absorptive liquid can comprise liquid water-free tetraethylenepentamine (TEPA). For example, the working fluid can be flue gas or engine exhaust, and the apparatus 100 or 200 can remove $CO_2$ from the flue gas or engine exhaust. Any other suitable working fluid and absorptive liquid are contemplated herein.

In certain embodiments, the apparatus has a surface area to volume (SN) ratio of greater than about 180 $m^{-1}$. In certain embodiments, the S/V ratio can be between 2500 $m^{-1}$ and 12500 $m^{-1}$.

Referring to FIGS. 5-10, the apparatus may include a plurality of cellular units 500, such as hex prism laves phase units, to form the matrix structure. For example, a plurality of cellular units 500 can be formed in a vertical stack and/or formed next to each other laterally as shown in FIGS. 7-10. A plurality of that shown in FIGS. 7-10 can be stacked and/or placed adjacent to each other in any suitable manner. Any other suitable shape for the matrix structure is contemplated herein.

The matrix structure can be pretreated. For example, it may be calcined in air for a predetermined time and temperature. The matrix support structure can be calcined in air or other suitable fluid, at a temperature of above 150° C., above 250° C., or above 350° C. before the absorptive liquid is disposed thereon. This has surprisingly been found to increase the uptake and performance of the absorptive liquid and thus improve the efficiency of absorption of the working fluid.

A high laser energy density, greater than 5 J/mm, is typically used in the 3D printing industry for certain metals, such as 316SS, in order to generate a solid part. However, this energy does not allow for porosity or rough features on the surface of the structure. At extremely low energy densities (below 0.5 J/mm), a structure will not form as the energy is not sufficient to melt or sinter the metal particles together. Thus, in certain embodiments using 316 SS, the apparatus can be additively manufactured using direct metal laser sintering (DMLS) at a predetermined energy density between about 0.5 J/mm up to about 5 J/mm to increase a species breakthrough time (Tb) and a Tb/mass of absorptive liquid. In certain embodiments, the material can be stainless steel, and the energy density can be about 1 or 1.5 to about 2.5, 3, 4, or 4.5 J/mm. The optimum energy density for other materials will be different, and there are many combinations of laser speed and power to achieve a particular density. Any other suitable material and/or energy density is contemplated herein. In view of this disclosure, one having ordinary skill in the art is able to determine an appropriate energy density for any desired material without undue experimentation in order to achieve one or more benefits as disclosed herein.

The apparatus can be made out of metal. Any other material suitable for the desired application is contemplated herein (e.g., ceramics, plastics). Additively manufacturing can include selective laser sintering (e.g., a metallic powder) at an energy density less than about 5, 4.5, 4, or 3.5 J/mm, e.g., to increase roughness of the metallic body.

The advantages of utilizing additive manufacturing (also referred to as "3D printing" herein) for the support structure include design freedom for producing complex internal geometries not easily capable of being synthesized via traditional manufacturing techniques. Void spaces may be customized to include shapes that maximize or minimize surface area or increase/decrease structure density. To begin, a 3D model is created via computer aided design software (e.g., any suitable 3D modeling software). This model can include details about the structure to be printed, including the cellular structures that make up the final part. As shown in FIGS. 7-10, these cellular structures can be made up of nodes 701 (e.g., connecting points) and struts 703 that are repeated inside a specific volume. While not shown in FIGS. 7-10, additional features such as micro-baffles (e.g., sheets formed between a plurality of struts 703) and/or shells can be added to create circuitous paths and chambers within the structure that may enhance desired characteristics, such as fluid contact and mixing.

Any suitable 3D printing process can be used. Certain embodiments disclosed herein utilize DMLS. Prior to printing, the user can define the amount of energy supplied during the process. Next the 3D model is "sliced" into discreet vertical layers with definable thickness to provide layer-wise instructions to the printer. This slice file contains the toolpaths and settings needed by the 3D printer to create the part. To print the part, a layer of metal powder can be added and selectively melted by one or more lasers. The heat generated via this technique fuses areas of melted powder to fused layers below it. This process is repeated based on the data defined in the slice file, until a final part is produced. In addition, a wide range of metals may be used by the DMLS technique (e.g., 316SS, AlSi10Mg, IN718, etc.). Another such 3D printing technique could be the direct energy deposition (DED) technique that flows powder to a point and melts it layer by layer directly.

The processes of metal powder sintering used herein resulted in apparatuses with a significant amount of surface roughness. Whereas traditional additive manufacturing processes seek to reduce surface roughness, the exterior roughness created herein can be beneficial to the ability of the structure to support the absorptive liquid.

The hex prism laves phase periodic cellular structures are enabled by the design and manufacturing freedom unique to 3D printing, which makes possible the creation of complex internal structures with micron-size features. The embodiments shown attempt to replicate the AB2 structures commonly found in the laves phase intermetallic with a hexagonal arrangement. The most common hex laves structure found in nature is MgNi2. Additional examples of hex laves structures can be found in Metals and Materials: Science, Processes, and Applications by R. E. Smallman and R. J. Bishop, first published 1995, and such structures are herein incorporated by reference. Any suitable laves structures or other similar cellular structures are contemplated herein.

Recent advances in design software has yielded software packages that can create cellular structures in a wide variety of forms. Two of these software packages are nTopology Element and Autodesk Netfabb. There are many periodic cellular structures that can increase surface area to volume ratio. These structures can have a wide variety of connections between the nodes. The cellular structures that mimic natural or non-natural structures include but are not limited to cubic, tetragonal, orthorhombic, hexagonal, rhombohedral, monoclinic, triclinic, trigonal, and the many variations thereof.

EXAMPLES

Effectiveness of High Temperature Pre-Treatment

An AlSi10Mg sample similar to that shown in FIG. 1 was put in a plasma cleaner for 5 minutes to increase the surface energy of the sample. A second identical sample was calcined in flowing air at 400° C. for 3 hours. Liquid water-free TEPA was then applied to both structures. The structures were then mounted in an experimental tube initially purged with $N_2$ followed by a $CO_2$ and $N_2$ 50:50 mixture that was sent to the entrance port of the tubes at room temperature. The outlet port of the tube was connected to a MS (mass spectrometer) for gas analysis. The breakthrough time (Tb) for $CO_2$ was then determined by quantifying when $CO_2$ was observed in the MS. The breakthrough time per gram of TEPA loaded onto the supporting structure (tbw) can also be determined by measuring the amount of TEPA that is loaded onto the support structure.

Table 1 below clearly shows that the calcination treatment greatly increases both the overall breakthrough time at room temperature as well as the breakthrough time compared to the amount of TEPA loaded onto the sample. The samples have identical PI values, both above 150 $m^{-1}$. Thus, the high temperature treatment is not only increasing the capacity of the sample for TEPA uptake, but even more surprisingly also it is increasing the efficiency of absorption.

TABLE 1

| Ex | Pre-Treatment | PI ($m^{-1}$) | Tb (sec) | Tbw (sec/g) |
|---|---|---|---|---|
| 1 | Plasma | 572 | 70 | 45 |
| 2 | Calcination at 400° C. | 572 | 180 | 135 |

A temperature range for air calcination can be greater than about 300° C. but must be less than the melting point of the particular material (e.g., less than about 500° C. for certain metals). The time of calcination can be a function of temperature. In certain embodiments, the time can be over an hour, such as 1 to 3 hours or 1 to 4 hours.

Impact of High Surface Area to Volume Ratio

A higher surface area to volume ratio is beneficial because it increases uptake of liquid by the structure. In Table 2, the surface area to volume ratio, S/V, is determined as described above for two samples. An AlSi10Mg sample having a matrix with a hex prism laves cellular structure has a significantly higher S/V ratio than an otherwise identical samples with a straight filament structure.

TABLE 2

| Geometry | Pre-Treatment | S/V ($m^{-1}$) | PI | Tb (sec) | Tbw (sec/g) |
|---|---|---|---|---|---|
| Straight Filament | Calcination at 400° C. | 1487 | 169 | 85 | 135 |
| Hex Prism Laves | Calcination at 400° C. | 2790 | 572 | 180 | 135 |

The increased S/V ratio more than doubles the breakthrough time at room temperature for $CO_2$ with an AlSi10Mg structure. Interestingly, the ratio S/V for the two tested support structures is 1.88, while the ratio of the breakthrough time is approximately 2.12. Expectedly, the breakthrough time average by the amount of TEPA loaded into the process does not change, showing a consistent flow behavior and mass transfer between the gas fluid and the structure. If this trend continues, then minimizing the hex prism laves cellular structure cell spacing from 1.4 mm to 0.5 mm would increase the S/V to 5810 $m^{-1}$. The current practical limit of DMLS for this detailed of a structure may be between 0.25 and 0.5 mm, however, this is subject to change with improved additive manufacturing technologies. A 0.25 mm spacing would have S/V of 9500 $m^{-1}$ and would have a breakthrough time of over 600 sec. In certain embodiments, a ratio of from about 2500 to about 12500 may be preferential to balance achieving a high breakthrough while still being able to manufacture the structure with controlled roughness.

As can be seen in the tables above, there is a nearly linear relationship of increased uptake between geometries, but a clearly not linear relationship for calcined vs. non-calcined structures.

Impact of Energy Density

Certain embodiments can be made at an improved energy density for the additive manufacturing process. For example, the energy density of the laser for the DMLS process can be used to ensure the production of the rough features that aid in retaining the absorptive liquid in the structure. The emergence of the rough features at the surface and performance during the absorption can be evaluated as a function of the laser power, scan speed, and spot size. In the test case, the spot size was constant at 0.08 mm. The laser energy density can then be determined as the laser power divided by the scan speed and the spot size.

Figure 11:
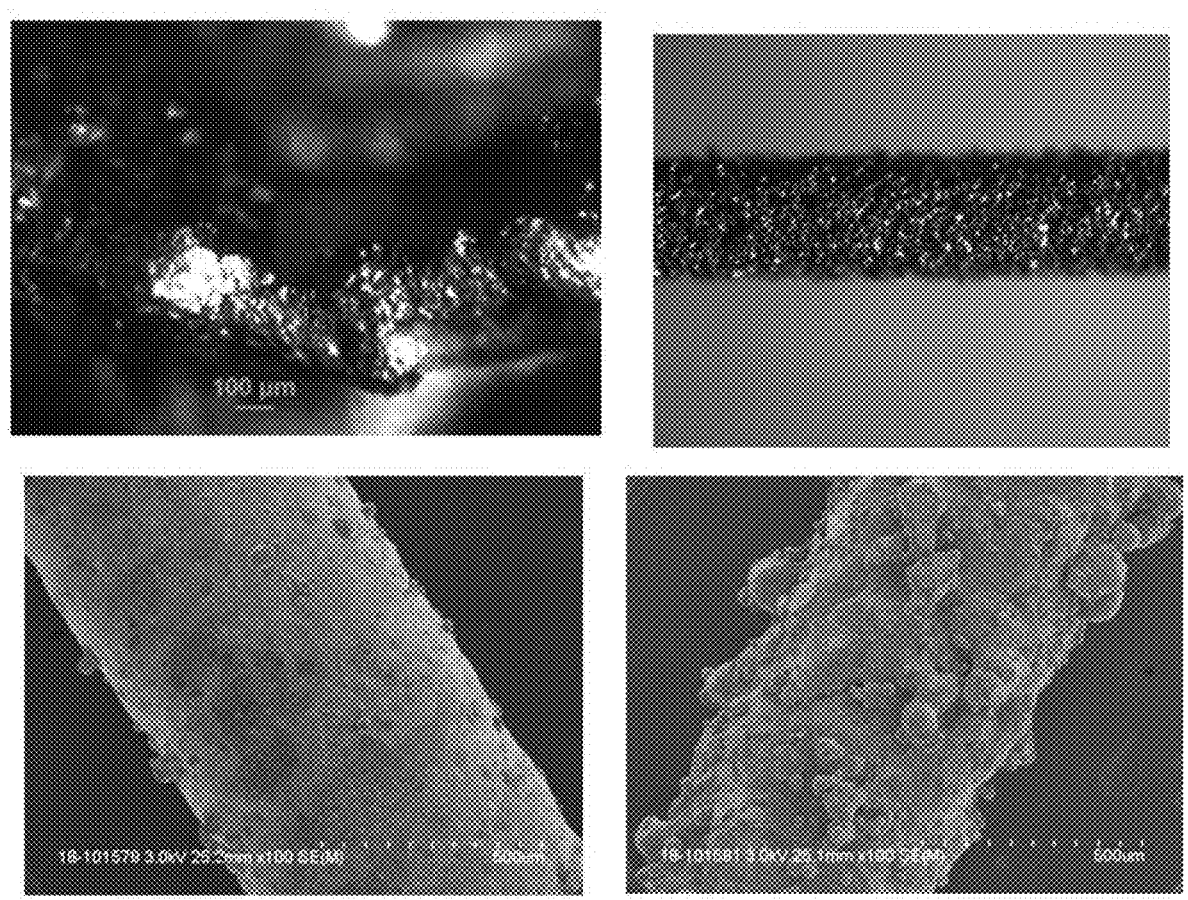
FIG. 11 shows four views comparing a high energy density additively manufactured structure (left two views) and a lower energy density (e.g., less than about 5 J/mm) additively manufactured structure (right two views).

As noted above, high laser energy densities of greater than 5 J/mm are typically used in the 3D printing industry for 316SS in order to generate a solid part. However, this energy density does not allow for surface porosity or rough features on the surface of the structure. Referring to FIG. 11, this is observed via the images on the left in FIG. 11, showing a relatively smooth surface.

A structure that was manufactured at a lower laser power and higher scan speed, but an overall lower laser density, had a significantly higher breakthrough time for $CO_2$ capture as shown below in Table 3. This structure has a significant amount of surface roughness as observed in the images on the right of FIG. 11. At energy densities below about 0.5 J/mm a structure will not form as the particles are not melted or sintered together. Thus, in certain embodiments, a range for laser density can be in the range of about 0.5 J/mm to about 5 J/mm for 316SS. This range may apply to other materials as well, however, ranges may change based on the material to be additively manufactured. Such energy densities and associated parameters (laser power, spot size, and scan speed) can be readily determined in view of this disclosure. The lower bound of energy density for any material may be an energy density where particles do not stick together, and the upper bound for any material may be below an energy density that causes a smooth, solid surface. As an example, those materials with higher melting points, such as AlSi10Mg will most likely have a slightly higher range than those materials with lower melting points, such as 316SS.

TABLE 3

| Structure Ex. | Laser Power (W) | Scan Speed (mm $s^{-1}$) | Laser Density (J $mm^{-2}$) | S/V ($m^{-1}$) | Tb (sec) | Tbw (sec $g^{-1}$) |
|---|---|---|---|---|---|---|
| Empty Cell | — | — | — | — | 35 | — |
| 1 | 175 | 400 | 5.5 | 2790 | 40 | 45 |
| 2 | 131 | 800 | 2.0 | 2790 | 180 | 135 |

The invention claimed is:

1. A species extraction apparatus comprising:
   an additively manufactured body supporting a matrix structure, wherein the matrix structure has a surface area to volume (S/V) ratio of greater than 180 $m^{-1}$ and wherein the body supporting the matrix structure is additively manufactured using a predetermined energy density of from 0.5 J/mm to 5 J/mm; and
   an absorptive liquid for removing at least one species from a working fluid that contacts the matrix support structure.

2. The apparatus of claim 1, wherein the at least one species is $CO_2$ and the absorptive liquid is liquid water-free tetraethylenepentamine (TEPA).

3. The apparatus of claim 1, wherein the matrix structure has a S/V ratio in a range of 2500 $m^{-1}$ to 12500 $m^{-1}$.

4. The apparatus of claim 1, further comprising a solid outer shell encasing the matrix structure, the solid outer shell configured to channel and maintain flow of the working fluid inside the shell.

5. The apparatus of claim 1, wherein the matrix comprises a plurality of cellular units.

6. The apparatus of claim 5, wherein the cellular units comprise hex prism laves phase units.

7. The apparatus of claim 5, wherein the cellular units comprise cubic, tetragonal, orthorhombic, hexagonal, rhombohedral, monoclinic, triclinic, or trigonal units.

8. The apparatus of claim 1, wherein the body is cylindrical in shape.

9. The apparatus of claim 1, wherein the body supporting a matrix structure is pre-treated before the absorptive liquid is disposed thereon.

10. The apparatus of claim 9, where the body supporting a matrix structure comprises metal and the pre-treatment comprises calcining in air at a temperature below that of the melting point of the metal.

11. The apparatus of claim 1, wherein the additive manufacturing comprises direct metal laser sintering.

12. The apparatus of claim 1, wherein the performance index (PI) of the apparatus is greater than 150.0 $m^{-1}$.

13. A method for liquid-based extraction comprising:
   i) forming an apparatus via additive manufacturing, the apparatus comprising a body supporting a matrix structure comprising cellular units, and having a surface area to volume (S/V) ratio of greater than 180 $m^{-1}$, wherein the body supporting the matrix structure is additively manufactured using a predetermined energy density of from 0.5 J/mm to 5 J/mm;
   ii) loading the apparatus with an absorptive liquid to form a loaded apparatus; and
   iii) contacting the loaded apparatus with a working fluid;
   wherein mass transfer of at least one substance in the working fluid occurs across the interface between the working fluid and the absorptive liquid.

14. The method of claim 13, further comprising pre-treating the apparatus prior to loading.

15. The method of claim 14, wherein the pre-treating comprises calcining the apparatus in air at a temperature of at least 150° C.

16. The method of claim 15, wherein the calcining is conducted for at least 30 minutes.

17. The method of claim 13, wherein the surface area of the absorptive liquid after loading, A1, is within 5% of the surface area, S, of the apparatus.

18. The method of claim 13, wherein the apparatus comprises metal and the additive manufacturing comprises selective laser sintering at an energy density less than 4.5 J/mm.

19. The method of claim 13, wherein the loaded apparatus has a PI of greater than 150 $m^{-1}$.

20. The method of claim 13, wherein the apparatus further comprises a solid outer shell encasing the matrix structure such that the solid outer shell channels and maintains flow of the working fluid inside the shell.

* * * * *